United States Patent [19]

Korthuis

[11] Patent Number: 5,010,719
[45] Date of Patent: Apr. 30, 1991

[54] METHOD AND SYSTEM FOR AUTOMATICALLY STEERING ALONG ROW CROPS

[75] Inventor: Scott A. Korthuis, Lynden, Wash.

[73] Assignee: Korvan Industries, Inc., Lynden, Wash.

[21] Appl. No.: 354,346

[22] Filed: May 19, 1989

Related U.S. Application Data

[63] Continuation-in-part of Ser. No. 302,588, Jan. 25, 1989, abandoned, which is a continuation of Ser. No. 202,116, Jun. 3, 1988, abandoned, which is a continuation of Ser. No. 875,631, Jun. 18, 1986, Pat. No. 4,750,322.

[51] Int. Cl.$^5$ .............................................. B62D 5/06
[52] U.S. Cl. .............................. 56/10.2; 56/DIG. 15; 180/131
[58] Field of Search ............. 180/131, 79; 56/10.2, 56/15.4, DIG. 15, 330; 104/244.1

[56] References Cited

U.S. PATENT DOCUMENTS

| | | | |
|---|---|---|---|
| 3,038,544 | 6/1962 | Richey et al. | 56/DIG. 15 |
| 3,402,784 | 9/1968 | Roberson | 180/79 |
| 3,550,790 | 12/1970 | Noble | 198/300 X |
| 3,797,602 | 3/1974 | Sumida | 180/79.1 |
| 3,952,828 | 4/1976 | Stampfer et al. | 180/131 X |
| 4,161,143 | 7/1979 | Fasse et al. | 104/244.1 |
| 4,295,323 | 10/1981 | Maier et al. | 56/10.2 |
| 4,304,316 | 12/1981 | Lang | 180/131 |
| 4,345,659 | 8/1982 | Arnold | 180/131 |
| 4,366,756 | 1/1983 | Brum | 104/244.1 |
| 4,367,802 | 1/1983 | Stiff et al. | 180/131 |
| 4,414,903 | 11/1983 | Fasse et al. | 104/244.1 |
| 4,505,094 | 3/1985 | Demorest | 56/10.2 |
| 4,528,804 | 7/1985 | Williams | 56/10.2 |
| 4,726,175 | 2/1988 | Day et al. | 56/10.2 |

*Primary Examiner*—Ramon S. Britts
*Assistant Examiner*—David J. Bagnell
*Attorney, Agent, or Firm*—Hughes & Multer

[57] ABSTRACT

A crop tending machine and method to automatically steer a harvesting machine and provide warning to the operator when there is a gap sensed in a crop row. The machine comprises a chassis that moves along a crop row axis, a location sensing member, a steerable wheel, and a control mechanism. The sensing member senses a distance of the machine from the axis. The steerable wheel has first and second predetermined angular positions that are angularly displaced by predetermined amounts from a straight ahead steering position. The control mechanism responds to the sensing member in a manner to move the steerable wheel to the first predetermined angular position when the machine is misaligned to a second side and to maintain the steerable wheel in the first position until the machine is more toward the first side at which time the control mechanism moves the steerable wheel to the second predetermined angular position and maintains the steerable wheel in the second position until the machine is more toward the second side. For safety, the machine is shut down when sensing of the row discontinues for a predetermined length of time. The method provides the chassis, the sensing member, the steerable wheel, and the control means, and provides for turning the control means to the first and second positions.

20 Claims, 9 Drawing Sheets

FIG. I

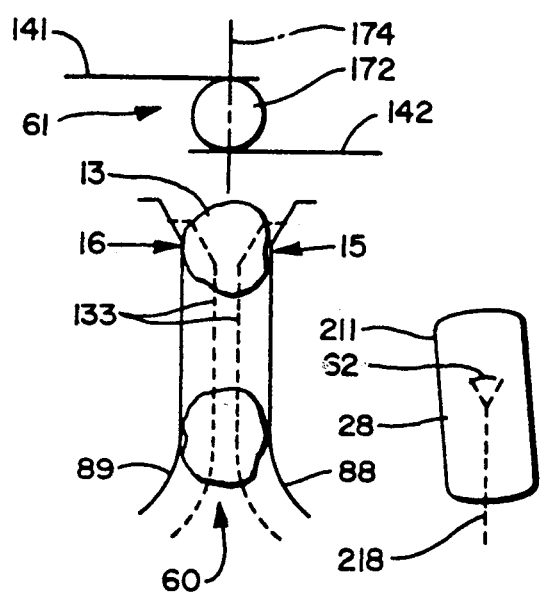
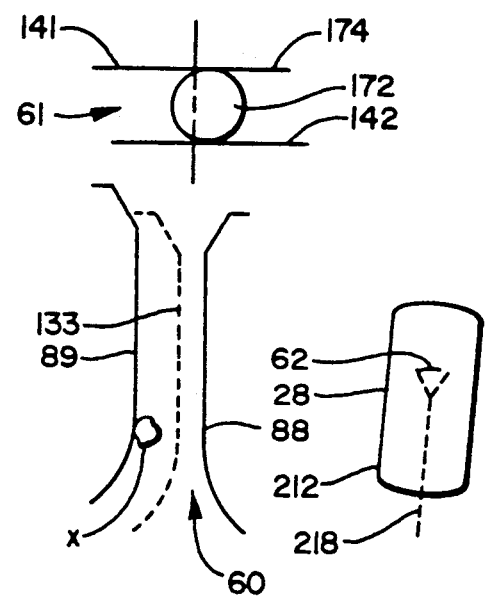
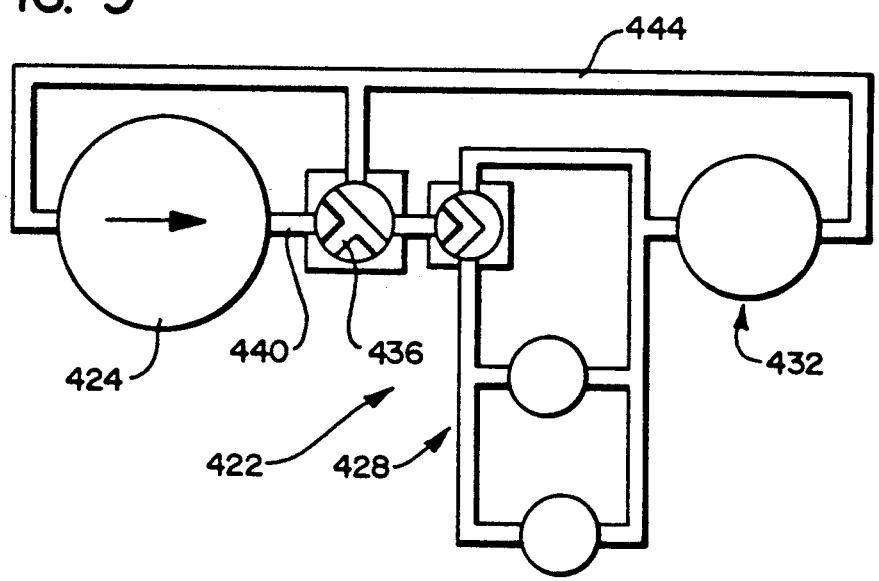

METHOD AND SYSTEM FOR AUTOMATICALLY STEERING ALONG ROW CROPS

CROSS-REFERENCES TO RELATED APPLICATIONS

This application is a continuation-in-part application of a U.S. Pat. application Ser. No. 302,588, filed on Jan. 25, 1989; now abandoned which is a continuation application of a U.S. Pat. application Ser. No. 07/202,116, filed on June 3, 1988, now abandoned; which is a continuation application of a U.S. Pat. application Ser. No. 875,631, filed on June 18, 1986, entitled "APPARATUS AND METHODS FOR DISLODGING AND COLLECTING PRODUCE FROM UPSTANDING CROPS" which was issued as U.S. Pat. No. 4,750,322.

BACKGROUND OF THE INVENTION

1. Field of the Invention

The present invention relates to automatic methods and systems for steering along row crops and preventing accidents during automatic steering, and more particularly to automatic methods for steering among row crops adapted for use in settings where thicknesses of plants vary.

2. Background Art

Automatic steering methods among row crops are commonly used in harvesting where thicknesses of plants change within a row, and they may be used elsewhere as well. In various applications, a human operator may lack the skills needed to steer efficiently an agricultural machine, e.g., a harvester. In these and other applications, a self-sufficient automatic steering method is indicated. However, if the human operator relies on automatic steering, through inattentiveness or preoccupation with other tasks the operator may miss gaps which occur in rows and allow the machine to overrun a row end, risking serious accident. Hence, a self-sufficient steering method must also be safe.

Conventional methods sense a deviation from a desired, straight ahead course and then correct the deviation so as to steer on a straight course. Several patents show this approach, U.S. Pat. No. 4,367,802 (Stiff et al.), U.S. Pat. No. 4,366,756 (Brum), U.S. Pat. No. 3,797,602 (Sumida), U.S. Pat. No. 3,550,790 (Noble), and U.S. Pat. No. 3,402,784 (Roberson), each using a furrow ploughed in the ground for guidance. U.S. Pat. No. 4,345,659 (Arnold) shows a variation for sod harvesting. Sometimes it is impractical to follow a furrow in the ground. Accordingly, methods employ dual resilient sensing arms which press against the right and left side of a row of crops and then generate on-off correction signals, as U.S. Pat. No. 4,528,804 (Williams) and a companion patent, U.S. Pat. No. 4,505,094 (Demorest) disclose.

The object of all of these methods essentially is to steer straight ahead. To do this, the methods require some sort of feedback which measures a corrective motion so that the tending machine attains a straight ahead course. For instance, this feedback appears in methods employing resilient crop-sensing arms. It takes a form there of a simple expedient of halting turning once the arm loses contact with the crops.

As the thickness of the plants changes, sensing members which press against the left and right sides of the plants may generate contradictory signals. Consequently, a hiatus in sensing may occur, and sometimes a human operator must monitor steering and frequently override an automatic system. Hence, variation in plant thicknesses presents a special kind of problem.

U.S. Pat. No. 4,304,316 (Lang) addresses this problem. It shows left and right resilient arms that generate hydraulic signals $X_1$ and $X_2$. These signals indicate a degree of steering error, thus they are quantitative. An arm 40 (or in a separate embodiment, a lever 86) within a hydraulic chamber produces an output hydraulic signal which is the absolute value of a difference $X_1-X_2$ between the signals. This process compensates for variations in plant thickness. However, this approach entails some new difficulties. This method includes a step, namely, correlating a corrective motion to a quantity of steering error. Without this step, the machine would not steer on a straight ahead course. To execute this step, this method requires hydraulic equipment, hoses and a valve body. Also, the fact that this method is self-sufficient and that a human operator is disengaged from driving the machine, heightens a need for protection against possible overrunning of row ends.

A type of gap protection as known in grass and grain crop steering methods. U.S. Pat. No. 3,952,828 (Stampfer et al.) shows left and right detectors 86 and 86', which sense the presence or absence of grain. At the end of a field they both generate signals which tell the harvester to halt. However, this process requires a field crop. Row crop steering methods still lack a satisfactory way to protect against overrunning of gaps and row ends.

Signals which an automatic steering system generates when contacting plants in a row, indicate the presence of the row. A gap in these signals can warn of a gap in the row. However, because of the focus of conventional methods on steering straight ahead, wherein an objective is to minimize row contact, the use of contact signals for gap detection is often forgotten. Additionally, hydraulics, or other means of quantitatively correlating corrections with errors, in certain circumstances can complicate the automatic steering process. The state of the art still insists on steering straight ahead only.

SUMMARY OF THE INVENTION

Accordingly, it is an object of the present invention to steer a row crop tending machine self-sufficiently among crops of varying thicknesses.

Another object of the invention is to exploit contact signals which a steering system generates thus preventing accidents due to the overrunning of gaps in rows and row ends.

Another object of the invention is to provide simpler methods and systems for monitoring a course and crop thicknesses, thereby reducing steps, the number of components, and cost.

Another object of the invention is to steer sufficiently close to row crops for a variety of agricultural applications.

The present invention accomplishes these and other objects which are apparent from consideration of the detailed description and claims.

In an embodiment of the invention, a machine used in agricultural operation, such as harvesting, has an automatic steering means and an automatic machine shutdown means. As used herein, a direction "forward" means the usual direction of travel of the chassis; a direction "outward" means away from the row of crops.

The automatic steering means of the invention includes the following functional elements a turning means, such as a steerable, ground-engaging wheel; a monitoring assembly; a pivoting control means; and a pivot position monitoring means. The row location assembly determines the location of first and second sides of the row with respect to the machine. The monitoring assembly, which communicates with the row locating assembly, monitors those locations and determines the location of a row axis or centerline with respect to the machine regardless of variations in the thicknesses of plants within the row. The turning means has first and second pivot limits both of which are angularly displaced from an alignment axis (which represents the direction in which the machine steers when moving straight ahead). The pivoting means moves the turning means angularly to either the first pivot limit or the second pivot limit. The pivoting control means directs the pivoting means to move toward the first pivot limit, to cease pivoting, or to move to the second pivot limit. Conditions where an alignment location fixed on the machine is off to first and second sides of the row centerline, respectively, are called "first and second turn conditions". Assuming that the first turn condition exists, the monitoring assembly imparts a signal to the pivoting control means, which starts the turning means (steerable wheel) moving toward its first pivot limit. When the turning means attains the first pivot limit, the pivot position monitor which is connected to the turning means imparts a signal to the pivoting control means which ceases pivoting of the turning means. The turning means is now in the first pivot limit and the machine steers itself back toward the row centerline.

Assuming that the second turn condition exists, the monitoring assembly imparts a signal to the pivoting control means which causes the turning means to move toward the second pivot limit. When the turning means reaches its second pivot limit, the turning means monitoring means imparts a signal to the pivoting control means which ceases pivoting of the turning means. The turning means is now in its second pivot limit and the machine steers back toward the row centerline.

Assuming in each case described that the row axis centerline is approximately straight, the described process repeats in cycles whereby the machine describes a path oscillating between the machine's first and second sides.

In this embodiment, the row locating assembly includes first and second, longitudinally extending, generally parallel, locating members. Each locating member has a forward portion, a middle portion, and a rearward portion, the forward portion curving forwardly and outwardly, and the middle portion aligning generally parallel to the row. The first locating member presses against a first side of the row and the second locating member presses against a second side. Resilient means connected to the locating members provides the pressing force.

Also, the monitoring assembly comprises first and second substantially parallel monitoring bars. These monitoring bars mutually define a monitoring pathway. The first monitoring bar is extendable in a first monitoring direction and retractable in a second, opposed monitoring direction; the second monitoring bar is extendable in the second monitoring direction and retractable in the first monitoring direction. A linkage means, comprising arms and rods, connects the first and second locating members to the first and second monitoring bars. The linkage means is arranged in a manner such that a displacement of the first monitoring bar in the first direction corresponds to an outward displacement of the first locating member, and a displacement of the second monitoring bar in the second direction corresponds to an outward displacement of the second locating member. A monitoring wheel which engages both of the monitoring bars is positioned between the monitoring bars. Preferably, each of the monitoring bars is a toothed rack, and the monitoring wheel is a toothed gear which engages the racks.

A technique as follows monitors the location of the row centerline in relation to the machine. In the monitoring pathway in a housing, at separate locations, are placed first and second monitoring switches. The monitoring wheel connects pivotally to a movable housing. The monitoring wheel and the movable housing are mounted in a channel means in a fixed housing in which they move back and forth together. Then, they move back and forth in response to the extension and retraction of the first and second monitoring bars. Due to the monitoring wheel's engagement with the first and second monitoring bars, the monitoring wheel moves in the first monitoring direction in the monitoring pathway when the first turn condition exists. It moves in the second monitoring direction in the monitoring pathway, when the second turn condition exists. Preferably, the positions of the two monitoring switches are arranged so that the following occurs: the switch activating member activates the first and second monitoring switches when the first and second turn conditions exist, respectively. It is also possible to position the switches in a manner to delay their activation beyond the described activation, although this reduces the invention's sensitivity to the first and second turn conditions.

When in the first and second pivot limits, the steerable wheel turns the machine toward the machine's first and second sides, respectively, (the machine's first side corresponding to the first locating member; the machine's second side opposing the first side). The pivot limit monitoring means monitors the steerable wheel's attainment of the first and second pivot limits and, once a pivot limit is attained, keeps the steerable wheel in that pivot limit until there is change in the turn condition. The pivot limit monitoring means includes the following components. The pivoting means connects to an arc-shaped switch activator which rotates through an angle that includes the first and second pivot limits. The arc-shaped switch activator describes a path as it pivots. First and second limit switches are positioned adjacent to that path in a manner such that the arc-shaped switch activator activates, respectively, the first and second limit switches when the steerable wheel is in the first and second pivot limits.

The described automatic steering components operate as follows. Assuming that the machine is in the first turn condition, an outward-rearward displacement of the first locating member exceeds such a displacement of the second locating member, the extension of the first monitoring bar in its first monitoring direction exceeds the extension of the second monitoring bar in its second monitoring direction, and the monitoring wheel is displaced in the first monitoring direction. The monitoring wheel and accompanying switch activating member activates the first monitoring switch. Then, being activated by the pivoting control means, the pivoting means pivots the steerable wheel toward the first pivot limit. Once the first pivot limit is attained, the first limit switch causes the pivoting control means to halt the pivoting of the steerable wheel which keeps the steerable wheel in the first pivot limit. The chassis now turns toward its first side. When the chassis is in the second pivot limit, a mirror image of the process just described occurs, wherein the row monitoring means and the pivoting control means, cause the steerable wheel to pivot toward the second pivot limit, the pivot limit monitoring means and the pivoting control means keep the steerable wheel in the second pivot limit, and the chassis turns toward its second side. Angles between the first and second pivot limits and the alignment axis are preferably about three to five degrees.

Now, the general features of the automatic machine shutdown means are detailed. Each displacement of one of the locating members constitutes a displacement signal. Thus, in the process of locating the row, the automatic steering means generates a plurality of such displacement signals. The automatic machine shutdown means stop the operation and locomotion of the machine when a predetermined amount of time elapses without any displacement signal occurring.

The automatic machine shutdown means functions as follows. Near the first and second monitoring bars, a plurality of displacement monitoring switches are positioned in a way that enables the switches to sense an extension of either of the monitoring bars. Such an extension indicates displacement of the first and second row locating members. Time measuring means which communicates with the displacement monitoring switches measures time elapsing between displacements of the locating members. If a predetermined amount of time elapses without any such displacement occurring, then machine shutdown means operatively connected to the time measuring means shuts down the machine.

Other features of the present invention will become apparent from the following description.

BRIEF DESCRIPTION OF THE DRAWINGS

FIGS. 8A through 8F are schematic views of row monitoring components, row locating bars, and a steerable wheel of the present invention in various conditions of operation;

FIG. 9 is a diagram of a hydraulic drive system of a harvester employing features of the present invention.

DESCRIPTION OF THE PREFERRED EMBODIMENT

A preferred embodiment of the invention is directed toward an automatic steering means 4 and an automatic machine shutdown means 8 by which a machine 10, used in harvesting or in other agricultural operations, is located laterally with respect to a row 12 of crops which the machine 10 is tending and also is shut down in situations to prevent accidents in the operation of the machine 10.

Figure 1:
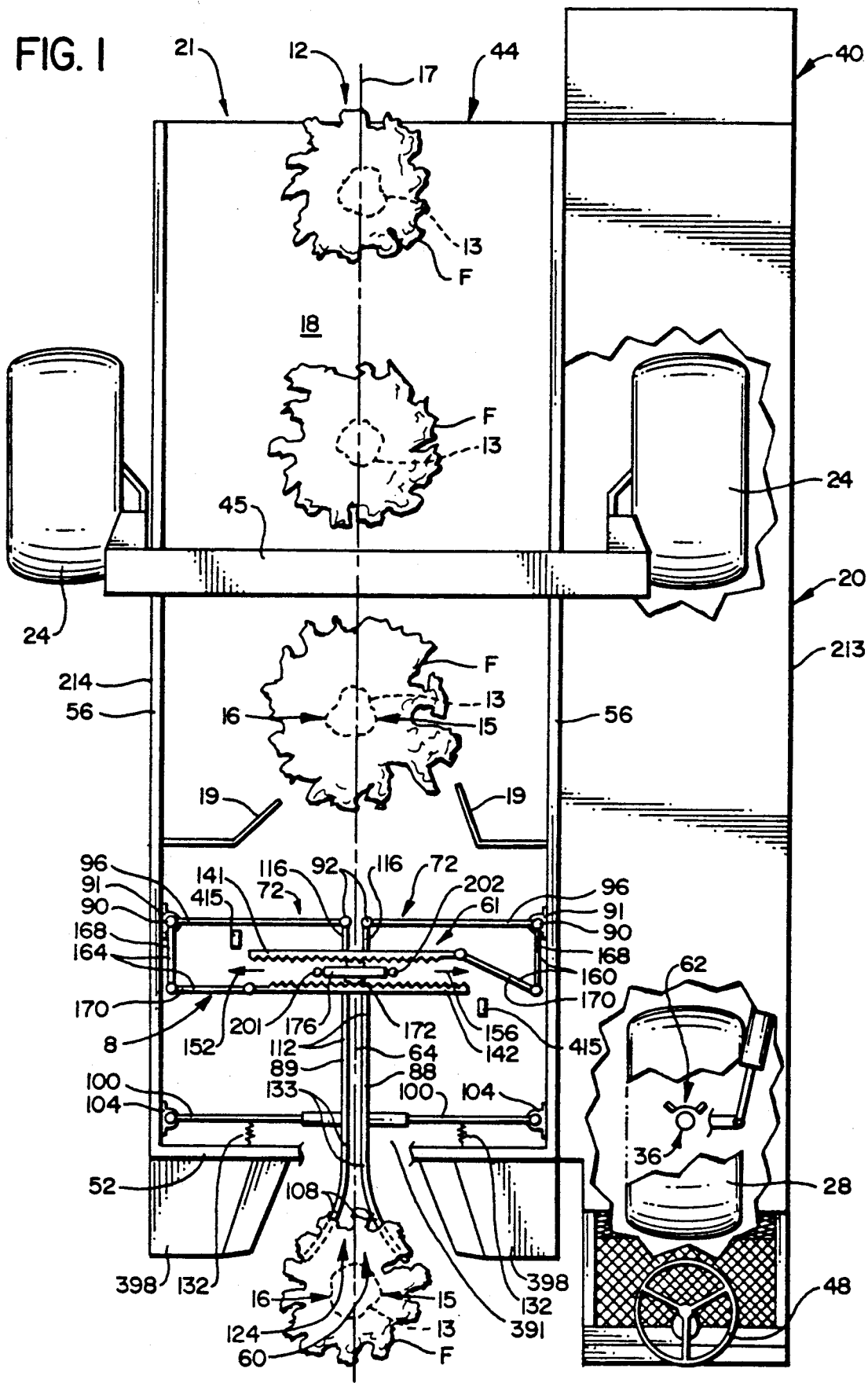
FIG. 1 is a plan view of a harvester embodying the teachings of the present invention, with portions of the body and a housing, which covers a rack and gear assembly, removed for purposes of illustration.
Figure 2:
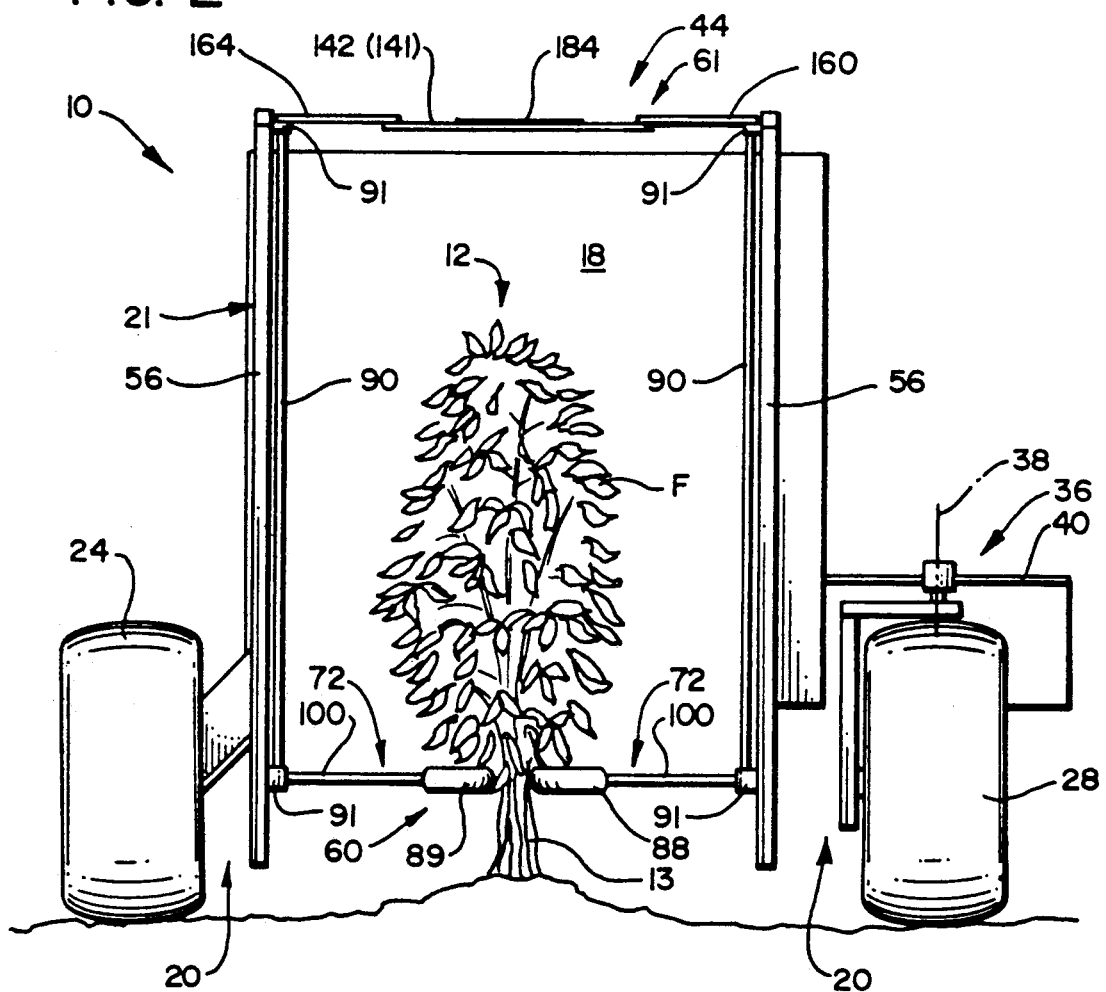
FIG. 2 is a front end view of the harvester of FIG. 1, illustrating just a chassis, ground wheels, and certain components of the present invention.
Figure 3:
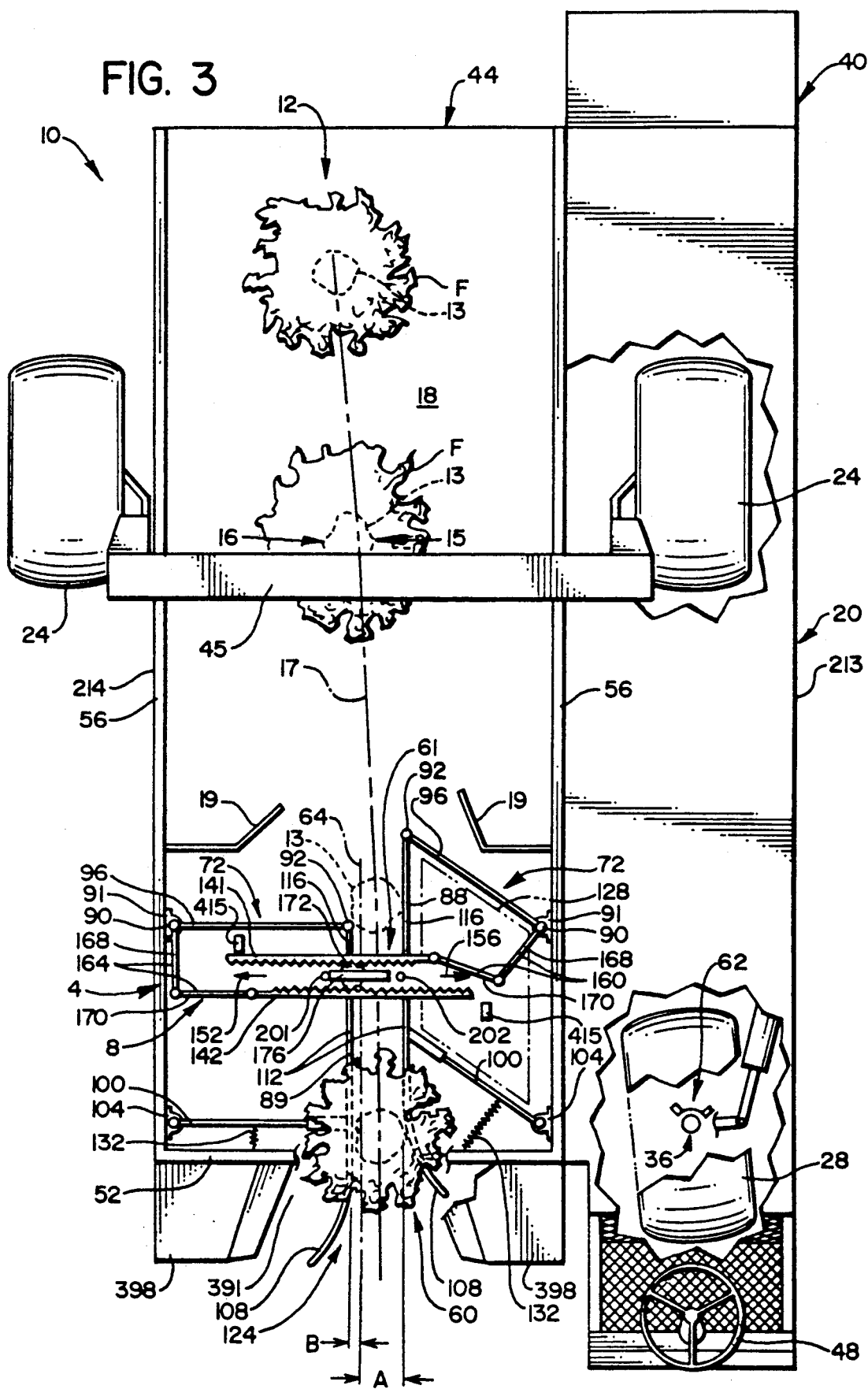
FIG. 3 is a view similar to FIG. 1 showing operation of components of the present invention.

Before describing the components of the automatic means 4 and 8 in summary and in detail, it is believed it would first be helpful to describe the machine 10 and the machine's environment. As shown in FIGS. 1, 2, and 3, the row 12 of crops comprises a plurality of plants certain portions of which, for instance stem portions 13 thereof, provide the machine 10 with a means of guidance for steering along the row 12. These portions 13 are used by the automatic steering means 4 as an index for locating the position of the row 12 with respect to the machine 10 and by the automatic machine shutdown means 8 for generating displacements of row locating members, to be described below, to indicate whether the row is present or absent. Accordingly, the portions 13 provide first and second lateral locating indices 15 and 16, which are surfaces that the locating members to be described engage laterally, and a row axis 17 which is located centrally between the lateral indices 15 and 16. Additionally, the plants in the row 12 have upper foliage portion F.

To continue describing the machine's 10 environment, agricultural operations, as indicated in FIG. 1, are performed by the machine 10 as follows. As the machine 10 moves along the row 12, the row 12 enters and passes rearwardly through an enclosure 18 in the machine 10, where two banks of agricultural operating equipment 19, positioned on either side of the enclosure 18, perform agricultural operations such as harvesting on the row 12. The equipment 19 includes crop beating means for dislodging produce from the crops.

Also, in terms of structure, as FIGS. 1 and 2 show best, the machine 10 itself comprises a chassis 20 and a body 21. To support and steer the chassis 20, the chassis 20 is mounted on two non-steerable ground wheels 24 and a turning means, such as a steerable wheel 28, mounted on a pivot mounting means 36 for pivoting about a vertical axis 38 of the wheel 28 as shown in FIG. 2. The chassis 20 then is the internal frame which connects the steerable wheel 28 in front and the two rearward drive wheels 24. As FIG. 1 shows, the body 21 comprises an attendant's portion 40 and an operating portion 44 connected together by a structural member 45, which is considered part of the chassis 20. The structural member 45 is able to move vertically up and down with respect to the rear wheels 24, thereby raising and lowering the operating portion 44 to which the structural member 45 is connected. The portion 40 provides the attendant with a supporting platform which allows riding upon the machine 10 and a steering wheel 48, rotation of which pivots the steerable wheel 28 for on-the-road steering and other maneuvering, such as maneuvering in headlands. The operating portion 44 has a forward end member 52 which connects two sidewalls 56.

The paragraphs that follow first summarily describe the functioning of the automatic steering means 4, this description being followed by a more detailed description. Additionally, the automatic shutdown means 8 is addressed both generally and specifically.

Figure 4:
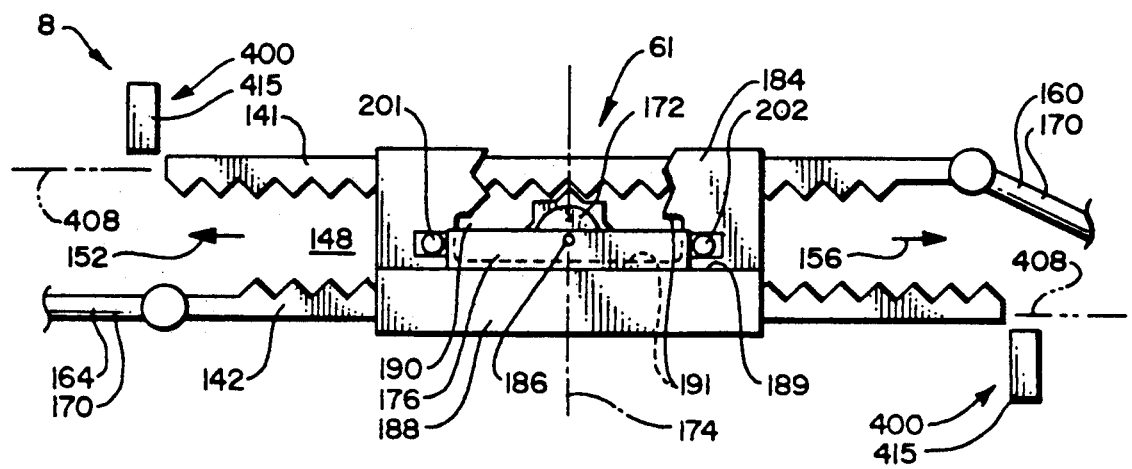
FIG. 4 is a plan view of a rack and gear assembly of the invention, with a portion of its housing removed.
Figure 5:
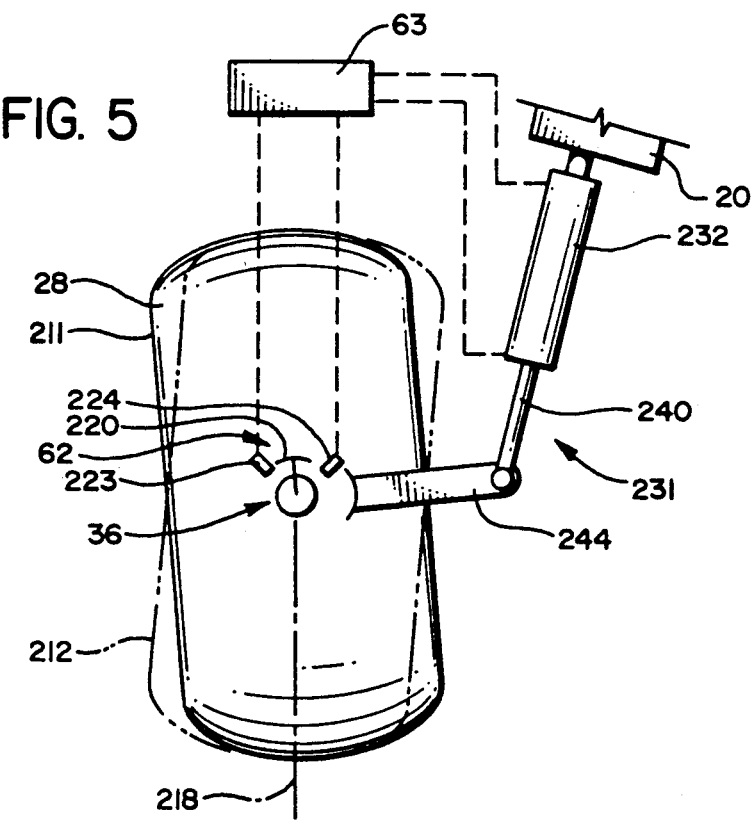
FIG. 5 is a plan view of a steerable wheel of the present invention shown in a first and a second pivot limit.
Figure 6:
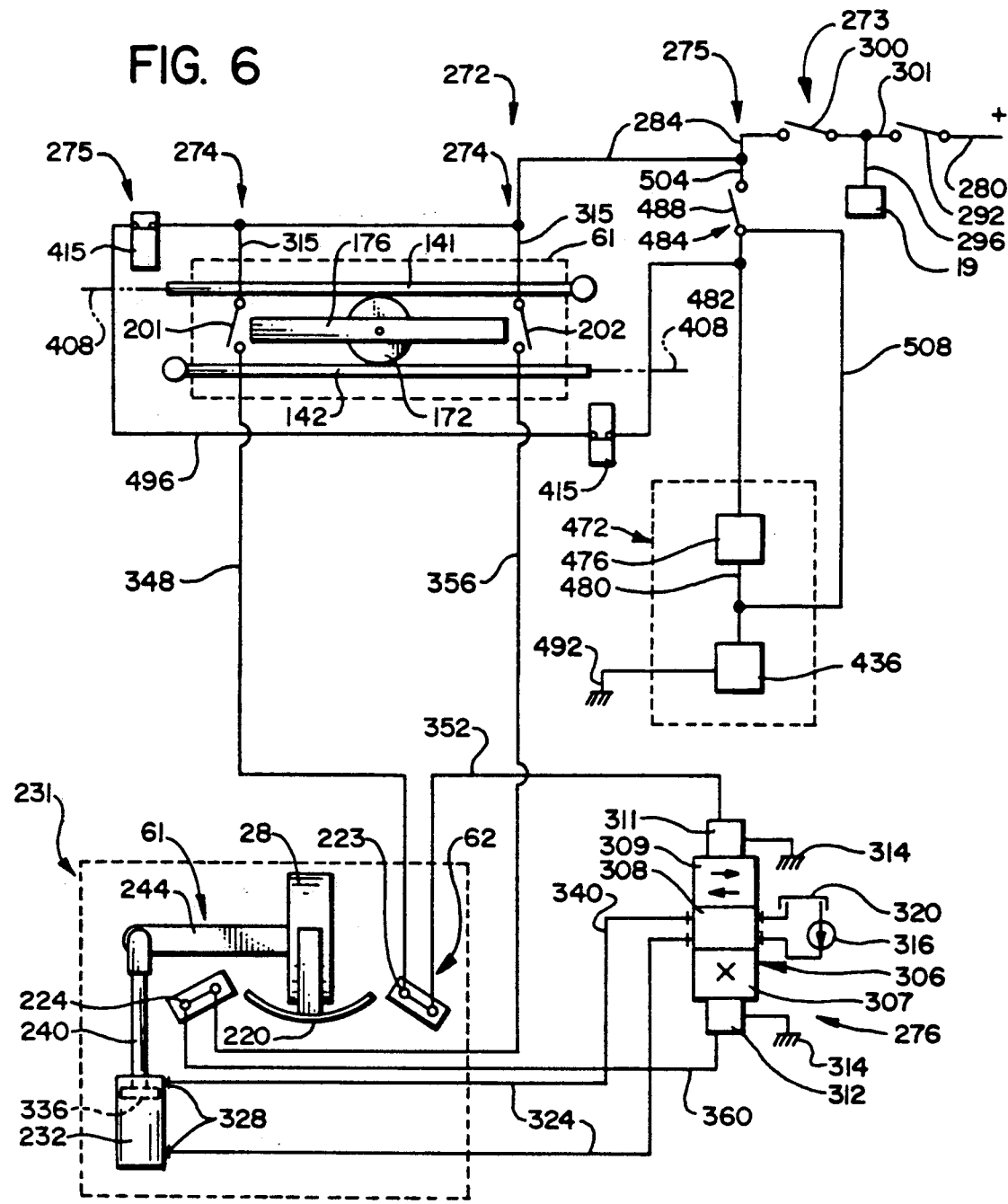
FIG. 6 is a circuit diagram including steering control and safety components of the present invention.

To summarize the automatic steering means 4, it includes the following functional components: a row locating means 60 (FIGS. 1 and 8), a monitoring means 61, and a steering control means, which comprises a pivot position monitoring means 62 and a pivoting control means 63 (FIGS. 5 and 6). As shown primarily in FIGS. 1 through 3, the row locating means determines the relative locations of the machine 10, in particular, as shown in FIGS. 1 and 3, a fixed alignment location or centerline 64 of the machine 10, and the row axis 17. In effect, as FIG. 3 shows best, the row location means 60 measures first and second row locating quantities A and B that, respectively, are distances from the centerline 64 to the first and second lateral row indices 15 and 16. The monitoring means 61, shown best in FIGS. 4 and 6, performs multiple functions as part of both the automatic steering means 4 and the automatic machine shutdown means 8: it monitors the location of the machine 10 relative to the row 12, as indicated by the row locating quantities A and B, for automatic steering purposes; also, it monitors displacement signals generated by displacements of row locating members caused by the indices 15 and 16, for automatic shutdown purposes. To focus on automatic steering, whereas the row locating means 60 communicates the quantities A and B to the monitoring means 61, the monitoring means 61 uses the quantities A and B to identify first or second turn conditions that exist, respectively, when the alignment location 64 is spaced laterally more than a predetermined distance from the row axis 17 on the first or second sides of the row 12, respectively. In accordance with a feature of the invention, the turning means 28 has first and second pivot limits, which are angularly displaced on opposite sides from a straight ahead alignment axis (to be discussed in connection with the pivot limits in the text below). The monitoring means 61 imparts to the steering control means turn condition signals indicating the existence of the first or second turn conditions; in response to these signals, the steering control means, which is operably connected to the steerable wheel 28, position the steerable wheel 28 at the first or second pivot limits, that is, when the first or second turn conditions, respectively, exist, the steerable wheel 28 turns fully to the first or second pivot limits, respectively. The pivoting control means 63 (which FIG. 6 illustrates) initiates pivoting of the turning means 28 toward one or the other of the pivot limits and ceases the wheel's 28 pivoting when the limit is reached. The pivot position monitoring means 62 (which is shown primarily in FIGS. 5 and 6), which communicates operatively with the pivoting control means 63 monitors the position of the steerable wheel 28.

Having described in general terms basic components within the automatic steering means 4, the discussion now turns to a detailed description of these components. To commence with a description of the row locating means 60, illustrated mostly in FIGS. 1 through 3, the means 60 first includes a row locating assembly 72 for measuring the row locating quantities A and B by engaging the first and second lateral row indices, respectively, with first and second row locating members 88 and 89 which the indices 15 and 16 displace laterally upon such engagement. Two row locating assemblies 72 are positioned in a forward part and on either side of the enclosure 18. Each of the two assemblies 72 positions its row locating member 88 and 89 parallel for lateral engagement therebetween with the two indices 15 and 16. Two locating shafts 90 rotate in response to lateral displacement of the locating members 88 and 89 to indicate a displacement of the row locating members 88 and 89. As FIG. 2 shows best, each of the two locating shafts 90 is mounted rotatably to a related one of the two sidewalls 56 by a plurality of mounting means 91. A rearward end 92 of each row locating member 88 and 89 connects hingedly to a rear supporting link 96, and each rear link 96 connects fixedly to one of the two locating shafts 90, thus linking mechanically each row locating member 88 and 89 to its related shaft 90. Two forward supporting links 100 each connect hingedly to one of the two row locating members 88 and 89 forward of the rear links 96. Each rear link 100 is connected hingedly to its related sidewall 56 by a mounting means 104. FIG. 3 shows best the configuration of the row locating members 88 and 89. Each row locating member 88 and 89 has a forward portion 108, a middle portion 112, and a rearward portion 116. A forwardly and outwardly curved configuration of each forward portion 108, as shown in FIG. 3, is intended to prevent jamming of the components of the machine 10 when the machine 10 encounters plants in the row 12. The middle portions 112 both align parallel to the two sidewalls 56. Each rearward portion 116 in practice aligns with its related middle portion 112, as shown in FIGS. 1 and 3. As FIGS. 1 and 3 show, the row locating members 88 and 89 are sufficiently long in relation to distances between the index portions 13 of the plants in the row 12 so that the row locating members 88 and 89 engage at least two of the portions 13 at a time. The two forward portions 108 of the members 88 and 89 define a rearwardly converging throat 124 which receives plants of the row 12 as the plants enter the enclosure 18. As mentioned, the row locating assemblies 72 serve to keep the members 88 and 89 parallel to the two sidewalls 56 and to mount the locating members 88 and 89 for rearward and outward displacement as the members 88 and 89 engage the row indices 15 and 16. This is accomplished by two parallel linkages as follows. Each of the row locating members 88 and 89 and one of the two rear links 96, sidewalls 56, and forward links 100, define a parallelogram 128: hence parallel linkages. (FIG. 3 illustrates only one of the two parallelograms 128, namely, the one corresponding to member 88.) As each of the row locating members 88 and 89 moves rearwardly and outwardly, this displacement of that row locating member 88 or 89 rotates its related locating shaft 90. Such rotation of the locating shafts 90 is a function of the rearward and outward displacement of the row locating members 88 and 89. Resilient means, which is illustrated in FIG. 1 and 3 as two springs 132 connected between a related one of the forward links 100 and the forward members 52, causes the row locating assemblies to press externally on the sides of the row 12. When the row 12 is absent, the assemblies hold the members 88 and 89 in a neutral position 133, shown in FIG. 1.

FIGS. 1, 3, and 4 illustrate the row monitoring means 61 which communicates with the row locating assemblies 72, just described, to monitor the location of the machine 10 in relation to the row 12. This is accomplished by the monitoring means 61 sensing the displacement of the row locating members 88 and 89, causing it to impart the turn condition signals to the pivoting control means 63. As FIG. 4 shows, first and second parallel monitoring bars 141 and 142 define therebetween a monitoring pathway 148. The monitoring bars 141 and 142 perform dual functions because they register the displacements of the locating members 88 and 89 caused by engagement with the indices 15 and 16, thus monitoring the location quantities A and B that indicate the machine's 10 lateral position, and they also indicate the displacement signals, i.e., the displacements of the locating members 88 and 89, for automatic machine shutdown purposes. To turn the discussion to the monitoring bars' 141 and 142 functions in automatic steering, they cooperate with a monitoring wheel, to be described shortly to find the difference between the quantities A and B, thereby monitoring the first and second turn conditions. The first monitoring bar 141 is slideably mounted for linear extension movement in a first monitoring direction 152 and for retraction in a second monitoring direction 156. The second monitoring bar 142 is similarly mounted to be able to extend in the second monitoring direction 156 and to retract in the first monitoring direction 152, the motions of the two bars 141 and 142 being independent. To enable the first and second monitoring bars 141 and 142, respectively, to communicate with the first and second locating members 88 and 89, the first and second monitoring bars 141 and 142 are respectively linked mechanically to a related one of the locating shafts 90 via first and second locating-monitoring communication linkages 160 and 164, shown best in FIG. 1. Each of the two locating-monitoring communication linkages 160 and 164 comprises a crank arm 168, which serves as a crank attached fixedly to one of the locating shafts 90, and a crank-monitoring coupler 170 which connects hingedly to a related one of the two monitoring bars 141 and 142. Each crank arm 168 connects hingedly to its related crank-monitoring coupler 170. Consequently, outward, rearward displacement of the first and second row locating members 88 and 89, respectively, extends the first and second monitoring bars 141 and 142, respectively, from their neutral positions in the first and second monitoring directions 152 and 156. When the first and second row locating members 88 and 89 are displaced inwardly and forwardly, the process reverses: the respective first and second monitoring bars 141 and 142 retract, with the first monitoring bar 141 retracting in the second monitoring direction 156, and the second monitoring bar 142 retracting in the first monitoring direction 152.

As FIGS. 4 and 8 show, a monitoring wheel 172 positioned between and engaged with the two monitoring bars 141 and 142 senses differences between the displacements of the first and second row locating bars 88 and 89. As FIG. 4 shows, the wheel 172 is a toothed gear 172 and the monitoring bars 141 and 142 are toothed racks 141 and 142, which engage the teeth of the gear 172. As FIG. 8A shows, assuming the extension of the first monitoring bar 141 from its neutral position in the first monitoring direction 152 is greater than the extension of the second monitoring bar 142 from its neutral position in the second monitoring direction 156, then the monitoring wheel 172 is displaced from a neutral position 174 (in the monitoring pathway 148) in the first monitoring direction 152. As FIG. 8B shows, if the extension of the second monitoring bar 142 in the second monitoring direction 156 is greater than the extension of the first monitoring bar 141 in the first monitoring direction 152, then the monitoring wheel 172 is displaced from its neutral position 174 in the second monitoring direction 156.

Figure 8A:
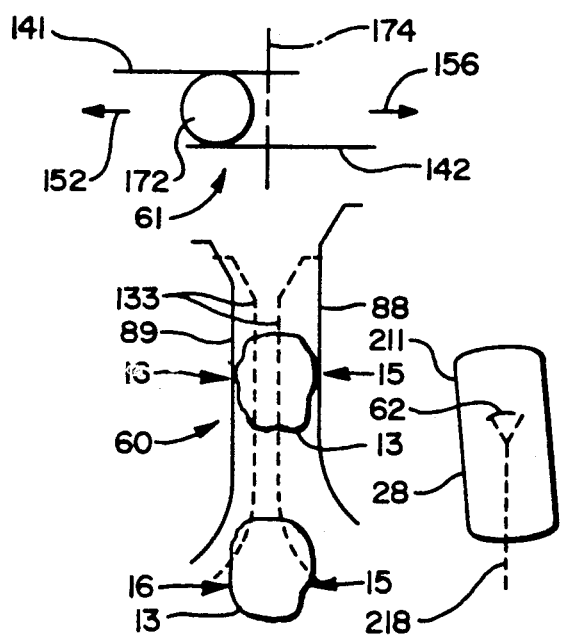
Figure 8B:
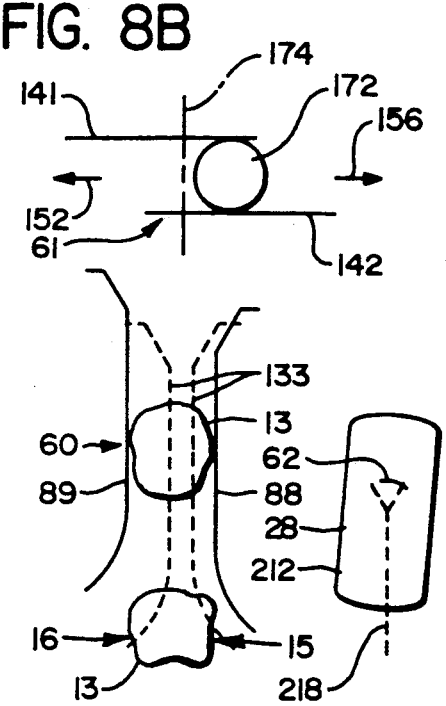
Figure 8C:
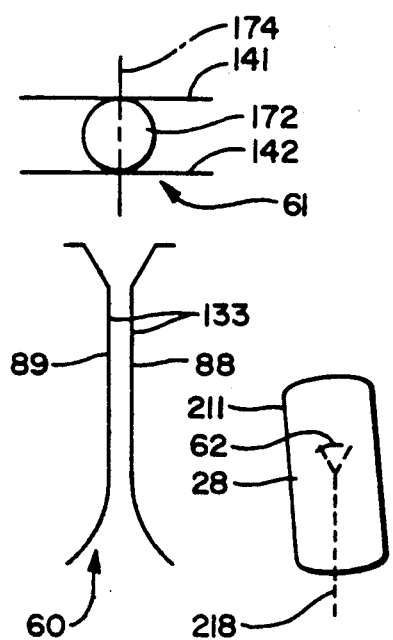
Figure 8D:
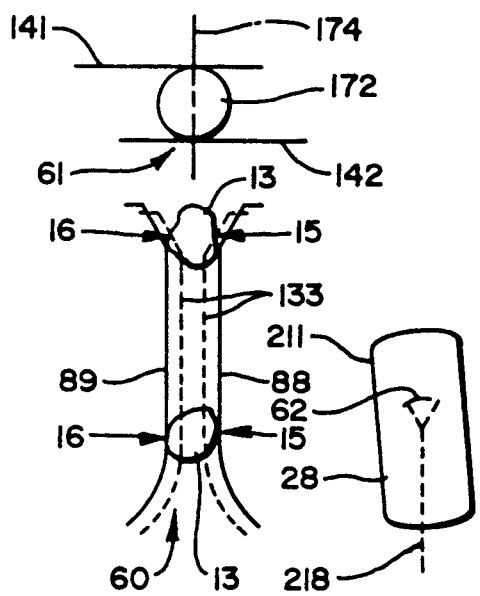

As FIGS. 8C, 8D and 8E respectively show that a disposition of the monitoring bars 141 and 142 in their neutral position, a minor equal displacement of the bars 141 and 142, and a substantial equal displacement of the bars 141 and 142 all leave the monitoring wheel 172 in its neutral position 174. In FIG. 8C, 8D and 8E, the steerable wheel 28 has remained angularly displaced from its straight ahead position; this is because the automatic steering means 4 causes the steerable wheel 28 to move from a pivot limit location in which the steerable wheel 28 is found only when the turn condition changes, that is, only when the monitoring wheel 172 has moved from one side of its neutral position 174 to the other side thereof. Hence, in the FIGS. 8C, 8D and 8E the wheel 28 will not pivot from the position in which it is shown until the monitoring means 160 registers a change in the turn condition.

As FIG. 4 shows best, to mount the components of the monitoring means 61 operably, there are provided a bar-shaped movable housing 176, in which the monitoring wheel is pivotally mounted for engagement with the monitoring bars 141 and 142, and a fixed housing 184, in which the monitoring bars 141 and 142 and the movable housing 176 are mounted slideably for mutually parallel, lateral back and forth movement. The movable housing 176 supports and guides the monitoring wheel 172 and it activates row monitoring switches described immediately below in connection with the turn condition signals. For pivotal mounting of the wheel 172 in the movable housing 176, the wheel 172 is connected to a pivot pin 186 connected pivotally to the housing 176. To guide the movable housing so as to maintain parallel relation thereof with the monitoring bars 141 and 142, the stationary housing 184 provides a guide member 188 with a longitudinal straight edge 189 along which the movable housing 176 runs. A longitudinal channel 190 with two sides 191 in the fixed housing 184 enables the monitoring wheel 172 to move freely back and forth.

To generate turn condition signals that indicate the existence of the first or second turn conditions, respectively, first and second row monitoring switches 201 and 202 are provided, as FIG. 4 shows, these being supported by and positioned in the fixed housing 184. The method by which the monitoring means 61 senses a difference in the displacements of the row locating members 88 and 89, and thus the existence of the first or the second turn conditions, includes these steps: the difference in the displacements of the row locating members 88 and 89 appears as a difference in the displacements of the monitoring bars 141 and 142 from their neutral positions which causes a displacement of the monitoring wheel 172 from its neutral position 174 in the first or second monitoring directions 152 and 156, respectively, indicating the existence of the first or second turn conditions. As FIG. 4 shows, the first and second monitoring switches are activated by the movable housing 176 in a manner such that activation of the first or second switches 201 and 202, respectively, indicates displacement of the monitoring wheel 172 (and the movable housing 176) from the neutral position 174 in the first or second monitoring directions 152 and 156.

In discussing the generation of turn condition signals further, details about the nature and the positioning of the switches 201 and 202 are addressed. In terms of their nature, the switches 201 and 202 are proximity sensing switches which sense the proximity of the movable housing 176: a preferred one of several possibilities is to use metal proximity sensing switches. As for the positioning of the switches 201 and 202, a sufficient distance should be provided between the switches 201 and 202 and the movable housing 176 in its neutral position to prevent both of the switches 201 and 202 from sensing the movable housing 176 at the same time: preferably, the switches 201 and 202 should be located quite close to the movable housing 176 in its neutral position 174. Presumably, this distance should be about one thirty-second of an inch; a greater distance delays the row monitoring switches 201 and 202's responses to displacements of the movable housing 176. Referring still to FIG. 4, the movable housing maintains sensory contact with either one or the other of the two switches 201 and 202: hence, the movable housing 176 should have a sufficient length 192 to prevent the movable housing 176 from losing sensory contact with the switches 201 or 202 as the movable housing 176 moves back and forth.

To correct the location of the machine 10 laterally relative to the row 12, as FIG. 5 shows, the steerable wheel 28 has a first pivot limit 211 and a second pivot limit 212. As FIGS. 1 and 3 show, when the steerable wheel 28 is at the first or second pivot limits 211 and 212, respectively, it turns the machine 10 toward first or second sides 213 and 214 of the machine 10 (corresponding respectively to the first and second row locating members 88 and 89). For purposes of illustration, FIG. 5 shows an alignment axis 218 representing the direction in which the machine 10 is traveling when moving along the row 12. The first and second pivot limits 211 and 212 of the steerable wheel 28 are angularly displaced on opposite sides from the alignment axis 218.

To enable pivoting of the steerable wheel 28 to halt when the steerable wheel 28 has attained either the first or second pivot limit 211 and 212, the pivot position monitoring means 62 shown in FIG. 5, imparts a limit signal to the pivoting control means 63 that halts pivoting of the steerable wheel 28 and keeps the wheel 28 positioned at the first or second pivot limits 211 or 212. The pivot position monitoring means 62 comprises a movable angular displacement indicator 220 which pivots with the steerable wheel 28 and first and second limit switches 223 and 224 fixed to the chassis 20. The angular displacement indicator 220 activates the first or second limit switches 223 and 224, respectively, when the steerable wheel 28 is at the first or second pivot limits 211 or 212. Inasmuch as the angular displacement indicator 220 is an arc-shaped member fixed to a pivotable part of the mounting means 36 for the steerable wheel 28, it travels through an angle, which includes the first and second pivot limits 211 and 212. As it pivots, it describes a path. The first and second limit switches 223 and 224 are positioned adjacent to that path in a manner such that the first or second limit switches 223 or 224, respectively, are activated when the steerable wheel 28 is at the first or second pivot limits 211 or 212.

Figure 2A:
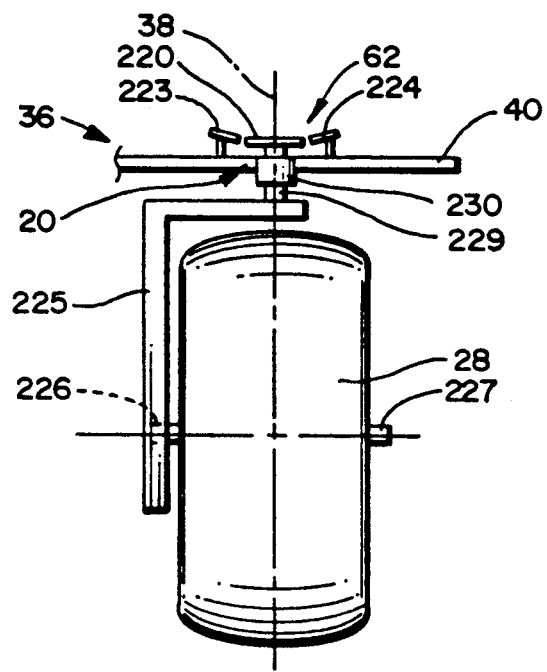
FIG. 2A is a front elevational view of a steerable wheel of the present invention mounted to a harvesting machine's chassis, with position monitoring components.

It is to be noted that the steerable wheel 28's pivotable mounting means 36 comprises elements as shown in FIG. 2A: a member 225 which connects to an end 226 of a transverse axle 227 of the steerable wheel 28 on which the wheel 28 rotates; a vertical pivoting pin 229, which is fixedly attached to the member 225 and which enables the pivotable mount 36 to pivot about the vertical axis 38 of the steerable wheel 28, connected fixedly to an upper portion of the member 225 and pivotally to the chassis 20 by a pivotal mount 230. The first and second limit switches 223 and 224 are fixed to the machine 10 while the angular displacement indicator 220 (visible in FIG. 5) is fixed to a movable pivoting component, such as the pivoting pin 229, of the pivotable mount 36.

To pivot the steerable wheel 28, there is provided a pivoting drive means 231, shown in FIG. 5, which comprises a conventional hydraulic drive cylinder 232 with one end fixed to the machine 10, a jack arm 240 and a pivot lever 244 operatively connected to the steerable wheel 28. As FIG. 5 shows, linear retraction or extension, respectively, of the jack arm 240 in the cylinder 232 moves the steerable wheel 28 toward the first or second pivot limits 211 and 212.

As shown in FIG. 6, a control circuit 272 is operatively connected to the main harvesting equipment 19 (of FIG. 1) in the machine 10, equipment for automatically steering, and automatic machine shutdown equipment. The control circuit 272 comprises three subcircuits. First, a coordination circuit 273 assures that the automatic steering 4 and the automatic shutdown 8 operate only when the main harvesting equipment 19 is on. Second, an automatic steering control circuit 274 transmits the turn condition signals from the row monitoring means 61 and the pivot position monitoring means 62 to the pivoting control means 63 thereby enabling the means 63 to control pivoting of the steerable wheel 28 to pivot in response to the relative locations of the machine 10 and the row 12. Third, an automatic machine shutdown circuit 275 responds to signals from the automatic shutdown system 8. Electric power is supplied from an electric power source 280 directly to the coordination circuit 273 and indirectly, via the coordination circuit 273 and a power line 284, to the automatic steering control circuit 274 and the automatic machine shutdown circuit 275.

Before turning the discussion to the details of the individual subcircuits, it is to be noted that the pivoting control means 63 of the automatic steering means 4 comprises essentially a control valve 276, shown in FIG. 6, which is to be discussed below in connection with the automatic steering control circuit 274.

To describe the coordinating circuit 273, as shown in FIG. 6, a positive terminal of the electrical power source 280 connects through a main power switch 292 and a line 296 to an electric solenoid which activates the operating equipment 19, such as the beater rods that engage the crop row 12 to remove the product therefrom. The main on/off switch 292 and a coordinating on/off switch 300 must both be closed in order for the remaining circuits of the control circuit 272—i.e., the automatic steering circuit 274 and the automatic machine shutdown circuit 275—to operate. This is because the power source 280 connects in series via the main on/off switch 292, a line 301, and the coordinating on/off switch 300 to the remaining circuits 274 and 275.

Before describing in detail the circuitry 274 for the automatic steering, more details of the electrically actuated control valve 276 of the automatic steering means 4 are provided, referring still to FIG. 6. The control valve 276 connects operatively to the pivoting drive means 231 to cause the steerable wheel 28 to do three things: pivot toward the first pivot limit 211, cease pivoting, or pivot toward the second pivot limit 212. The control valve 276 comprises a main valve element 306 having a reverse flow section 307, a middle, off section 308, and a forward flow section 309, the three sections 307, 308 and 309 of the element 306 being selectively connected to the hydraulic cylinder 232 to direct hydraulic fluid in a manner to control the pivoting of the steerable wheel 28 as described. First and second solenoids 311 and 312 are operatively connected to opposing ends of the control valve 276 to magnetically draw the element 306 in opposing directions. Hence, as FIG. 6 shows, energization of the first or second solenoids 311 or 312, respectively, draws the element 306 so as to align the sections 307 or 309, respectively, for reverse or forward flow, respectively, of pressurized fluid, which initiates pivoting of the steerable wheel 28 toward its first or second pivot limits 223 or 224, respectively. When the current is off, neither of the solenoids 311 or 312 draw the element 306. Accordingly, resilient means in the control valve 276 positions the element 306 so that the off section 308 thereof is aligned to stop fluid flow, causing pivoting of the steerable wheel 28 to cease. The solenoids 311 and 312 are grounded by two separate grounds 314.

To describe the automatic steering control circuit 274, as discussed previously in connection with the turn condition signals, the monitoring means 61 includes the first and second row monitoring switches 201 and 202 as shown in FIG. 6. In the circuit 274, the row monitoring switches 201 and 202 are normally open. The circuit 274 also includes the two limit stitches 223 and 224, also discussed previously in connection with the pivot position monitoring means 62, that are normally closed. As FIG. 6 shows, in the circuit 274, the first and second row monitoring switches 201 and 202, respectively, are connected in parallel via the first and second limit switches 223 and 224, respectively, to the first and second solenoids 311 and 312 of the control valve 276, respectively. That is, the power line 284 gives power to the two row monitoring switches 201 and 202 via two separate branch lines 315; then, the first row monitoring switch 201 connects, via a line 348, the first limit switch 223, and a line 352, to the first solenoid 311; the second row monitoring switch 202 connects, via a line 356, the second limit stitch 224, and a line 360, to the second solenoid 312. Additionally, the following points are to be noted: the control valve 276 receives pressurized hydraulic fluid from a fluid source 316 and it returns hydraulic fluid to a fluid reservoir 320; the control valve 276 connects operatively via two separate hoses 324 and two separate ports 328 of the cylinder 232 to opposite sides of a piston 336 within the cylinder 232.

Having described the automatic steering circuit 274, operation of the automatic steering means 4 using the automatic steering circuit 274 is now addressed. In operation, the automatic steering means performs as follows. As shown in FIG. 8C, when there is no row 12 between the locating members 88 and 89, the members 88 and 89 are nearly together. As FIG. 8D shows, and as mentioned previously, introduction of the row 12 displaces the sensing members 88 and 89 outwardly and rearwardly. As FIG. 8A shows, and also as previously mentioned, assuming that the machine 10 is steered too far with respect to the row 12 toward the machine's side corresponding to the second row locating member 89, the displacement of the first row locating member 88 exceeds the displacement of the second row locating member 89. Consequently, as FIG. 6 shows, the monitoring means 61, by closing the first row monitoring switch 201, imparts the turn condition signal to the control valve 276 for initiating pivoting movement of the steerable wheel 28. This energizes the first solenoid 311 of the control valve 276 which directs pressurized fluid to the cylinder 232 of the pivoting drive means 231 retracting the piston arm 240 and pivoting the steerable wheel toward the first pivot limit 211. Referring still to FIG. 6, when the steerable wheel 28 reaches the first pivot limit 211, this opens the first limit switch 223, breaking the circuit to the first solenoid 311, which aligns the section 308 of the valve element 306 to stop fluid flow ceasing the pivoting of the steerable wheel 28. Returning to FIG. 8A, this leaves the steerable wheel 28 at the first pivot limit 211 (the sequence just described, including this attitude 211 of the steerable wheel 28, is also shown in FIG. 3), then, the machine 10 steers toward its first side 213 which brings the centerline 64 of the machine 10 back toward the row axis 17 of the row 12. Assuming that the centerline 64 of the machine 10 crosses the row axis 17 making the machine 10 off-center to the opposite side 15 of the row 12, in a sense there occurs a mirror image of the above-described sequence, as FIG. 8B indicates. Because the subsequent steps are identical to the described steps, further detailed description of those steps is deemed unnecessary, except to note that the steerable wheel 28 assumes the second pivot limit 212, as shown by the attitude 212 of the steerable wheel 28 in FIG. 8B, and turns the machine 10 toward its second side 214, thus bringing the centerline 64 of the machine 10 back to the row axis 17.

Figure 7:
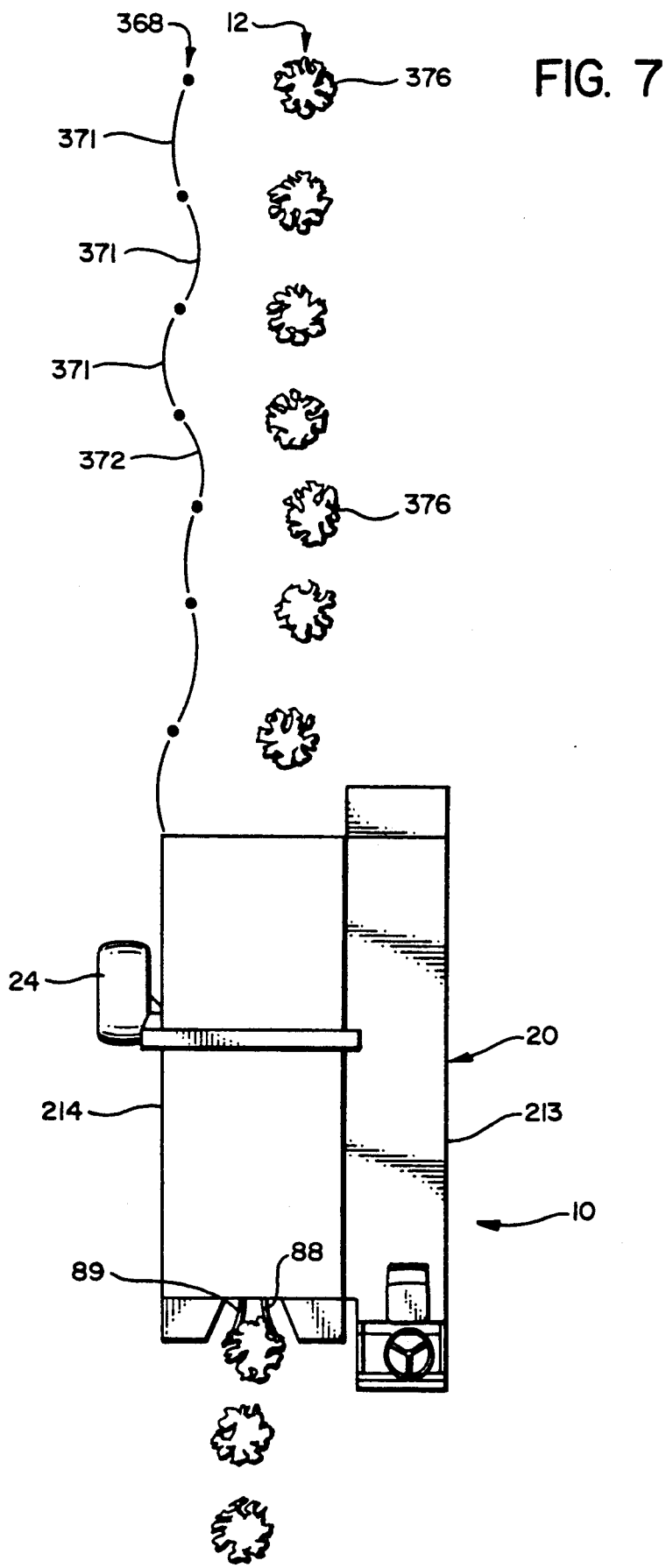
FIG. 7 is a plan view of a path along which a machine employing the teachings of the present invention travels.

As FIG. 7 shows, in the machine's 10 normal operation, it describes a path 368 that consists of a plurality of alternating first turns 371, during which the steerable wheel 28 is at the first pivot limit 211 and the machine 10 steers toward its first side 213, and second turns 372, during which the steerable wheel 28 is at the second pivot limit 212 and the machine 10 steers toward its second side 214. In short, the machine 10 experiences a cyclical steering pattern characterized by repeated turns.

Before turning to a description of the automatic machine shutdown means 8, it is thought that supplementary information will assist the reader. In harvesting berries, berry plants may be grouped in a plurality of "hills" 376, which FIG. 7 shows, in effect tight groupings of individual vines which are estimated to be roughly 30" apart. These steering cycles of the machine can be quite regular, cycling completely between the first and second turns 371 and 372 about once for every two hills, or it may be that the machine 10 will travel a longer distance before initiating a new turn.

It is to be noted that an angle which FIG. 5 shows between the first pivot limit 211 and the alignment axis 218 and an angle between the second pivot limit 212 and the alignment axis 218 should be within the following range. These angles should be sufficiently large, considering the speed of the machine 10, to provide adequate correction of steering errors. In practice with berry harvesting the berries being planted in the described hills 376 of FIG. 7, a minimum angle of three degrees from the alignment axis 218 can provide an adequate correction capability at a speed of one-and-one-half miles per hour. Additionally, these angles should be sufficiently small to give the steerable wheel 28 adequate time to rotate between the pivot limits 211 and 212 before a new change in the turn condition occurs. It is estimated that a maximum angle of five degrees between the pivot limits 211 and 212 and the alignment axis 218 is appropriate. This is a correction on the order of about 2" for a traveling distance along the row of 30" (2.1"=30"×tan 4°).

Also, with many kinds of plants such as berry bushes or vines, the stem portion 13 of the plant is usable as an index for automatic steering guidance. Row locating members 88 and 89 are adaptable to different kinds of indices, which provide the basic dual, lateral indices 15 and 16 which the present invention employs. As FIG. 2 shows, with plants having stem portions usable as indices, the row locating members 88 and 89 should be positioned low enough so that they engage the stem portion 13 rather than the foliage portion F. Additionally, as FIG. 1 illustrates, when the row locating assemblies 72 are in their central, neutral positions 133, the row locating members 88 and 89 should be sufficiently close to one another to assure that they respond to plants of the smallest diameter in the row 12. For instance, with berry plants, when the row locating assembly 72 is in its neutral position 133, the row locating members 88 and 89 should be about one inch apart. As indicated in FIG. 3, the capacity of the automatic steering means to accommodate the widest plants depends upon the capacity of the resilient means 132 to extend, the freedom of the row locating members 88 and 89 to move outwardly and rearwardly, the width a passageway 391 defined between two crop receiving hoods 398 fixed to the forward end of the chassis 20 of the machine 10, and a capacity for lateral movement of the row monitoring wheel 172 and the movable housing 176. In berry harvesting, the lateral displacement capacity of each row locating member 88 and 89 believed necessary from the alignment location 64 of the machine is about eleven inches.

If an aberration, such as a stray rock, comes in the path of the row locating members 88 and 89, assuming such an aberration displaces only one of the row locating members 88 and 89, as FIG. 8F shows, the automatic steering means 4 automatically limits its sensitivity to the aberration. Inasmuch as the row monitoring wheel 172 is displaced only half an amount of displacement as one of the monitoring bars, illustrated as the second row monitoring bar 142, the sensitivity of the row monitoring wheel 172 to the aberration is lessened.

FIGS. 4, 6 and 9 best illustrate the automatic machine shutdown means 8. The automatic machine shutdown means utilizes displacement signals generated by the automatic steering means 4, indicating displacement of the row locating members 88 and 89, to sense the presence or the absence of the row 12. As discussed previously in connection with the monitoring means' 61 multiple functions, the means 61 indicates these displacement signals by linear movement of the first and second monitoring bars 141 and 142. A displacement signal sensing means 400, indicated in FIG. 4, senses these movements of the first and second monitoring bars 141 and 142, and imparts displacement signals to a machine shutdown means described below. The machine shutdown means monitors time which elapses between the displacement signals. Then, if a predetermined amount of tire elapses without any displacement signals occurring, the machine shutdown means halts the operation and the locomotion of the machine 10.

To sense the displacement signals, the displacement signal sensing means 400, as FIG. 4 shows, comprises a plurality of displacement sensing switches described shortly. As they move back and forth, the first and second monitoring bars 141 and 142 describe linear paths 408 comprised in FIG. 4. The displacement sensing means 400 locates a plurality of displacement sensing switches 415 located adjacent to the paths 408 of the first and second monitoring bars 141 and 142 in a manner such that the switches 415 sense any displacement of the first and second row locating bars 88 and 89 occurring. Proximity of the first and second row monitoring bars 141 and 142 to the displacement signal sensing switches 415 activates the switches 415. A preferred one of several possibilities is for the first and second monitoring bars 141 and 142 to comprise metal and the displacement signal sensing switches 415 to be metal proximity sensing switches.

To halt the movement and operation of the machine 10, there is a machine interruption means, which FIG. 9 illustrates. FIG. 9 shows a hydraulic locomotion and operation system 422 for the machine 10. A hydraulic pump 424 provides pressurized hydraulic fluid to operation components 428 and locomotion components 432 of the machine 10. Operation components 428 include means for carrying out certain operations of the machine 10, such as belt-type produce catching system used in harvesting. Machine locomotion components 432 propel the machine 10. A machine interruption means 436 shuts off the flow of pressurized hydraulic fluid to the operating components 428 and the locomotion components 432 thereby halting the operation and locomotion functions. A fluid artery 440 provides pressurized fluid from the pump 424 to the operating components 428 and the locomotion components 432. Fluid return means 444 returns hydraulic fluid from the operating and locomotion components to the pump 424. The interruption means 436 which is electrically activated, simply connects the fluid artery 440 directly to the fluid return means 444, completely bypassing the operation components 428 and the locomotion components 432.

The automatic machine shutdown circuit 275 of FIG. 6 enables the displacement signal sensing switches 415 to communicate operably with a machine shutdown means 472. The machine shutdown means 472 comprises the operation locomotion interruption means 436, just described, and a clock means 476. The clock means 476 measures time which elapses between the occurrence of displacement signals. If a predetermined amount of time elapses without any displacement signals occurring, the clock means 476 activates the operation locomotion interruption means 436. A line 480 enables the clock means 476 to communicate with, and activate, the operation locomotion interruption means 436. The clock means 476 activates the interruption means 436 when the clock means 476 receives electric power continuously for the predetermined amount of time. An interruption in the power supplied to the clock means 476, resets the clock means 476. The displacement signal sensing switches 415 are normally closed. Accordingly, if the predetermined amount of time lapses without a displacement signal occurring, the displacement signal sensing switches will allow power to be conducted through the automatic machine shutdown circuit 275 continuously to the clock means 476.

The automatic machine shutdown circuit 275, as FIGS. 6 shows, is wired to respond to displacement signals as follows. The two displacement signal sensing switches 415 are wired in series to the electrical power source 280; the machine shutdown means 472 and the displacement signal sensing switches 415 are also connected in series. In detail, the two displacement signal sensing switches 415 are mutually connected by a line 496. One of the displacement signal sensing switches 415 connects directly to the power line 284; the other displacement signal sensing switch 415 connects to the machine shutdown means 472 by a line 482.

Additionally, the automatic machine shutdown circuit 275 includes supervision assurance means 484 for assuring that the operation and locomotion functions of the machine will operate only with the supervision of a human attendant. If a human attendant is absent from the attendant's portion 40 of the machine 10, shown in FIG. 1, then the supervision assurance means 484 actuates the machine shutdown means 472. The supervision assurance means 484 includes an attendant sensing switch 488, which for example could be placed at the chair on which the operator sits, with the switch opening when the operator is positioned in the chair. Electric power source 280 connects via the power line 284, a line 504, the switch 488, a line 508, and a line 482 to the machine shutdown means 472. Absence of the operator from the chair closes the switch 488 immediately actuating the machine interruption means 436.

To enable the supervision assurance means 484 to actuate the machine shutdown means 472, these two components are connected in series to the power source. Appropriate ground means 492 ground the machine shutdown means 472.

If the operator is not in the chair, the switch 488 closes power supplying power to the machine shutdown means 472. It is to be noted that the switches 415 are positioned sufficiently close to the bars 141 and 142 so that any significant touching of the members 88 and 89 and the row 12 will activate the switches 415.

It is to be understood that a number of variations of automatic machine shutdown means, which address the problems described herein, can be adapted for use with automatic steering methods and systems, inasmuch as these methods and systems generate displacement signals or other indications of the presence and absence of the row 12.

Assuming that either of the monitoring bars 141 and 142 moves from its neutral position within the predetermined amount of time, then the automatic machine shutdown circuit 275 will deliver no electricity to the operation locomotion interruption means 436. If both of the monitoring bars 141 and 142 remain in their neutral positions for the predetermined amount of time, then the displacement signal sensing switches 415 will remain closed, power will be supplied to the interruption means 436, and the operation and locomotion of the machine 10 will halt.

The predetermined amount of time should be selected to provide prompt halting of the machine 10, assuming that the machine 10 is at the end of the row 12. Sometimes there are headlands which allow a margin of safety at the ends of the rows 12. However, in other cases irrigation ditches are close to the ends of the rows 12. The time should not be so short that a minor hiatus in the row 12, such as a pathway, triggers a shutdown. In certain circumstances, then, an appropriate time is two to five seconds.

Figure 10:
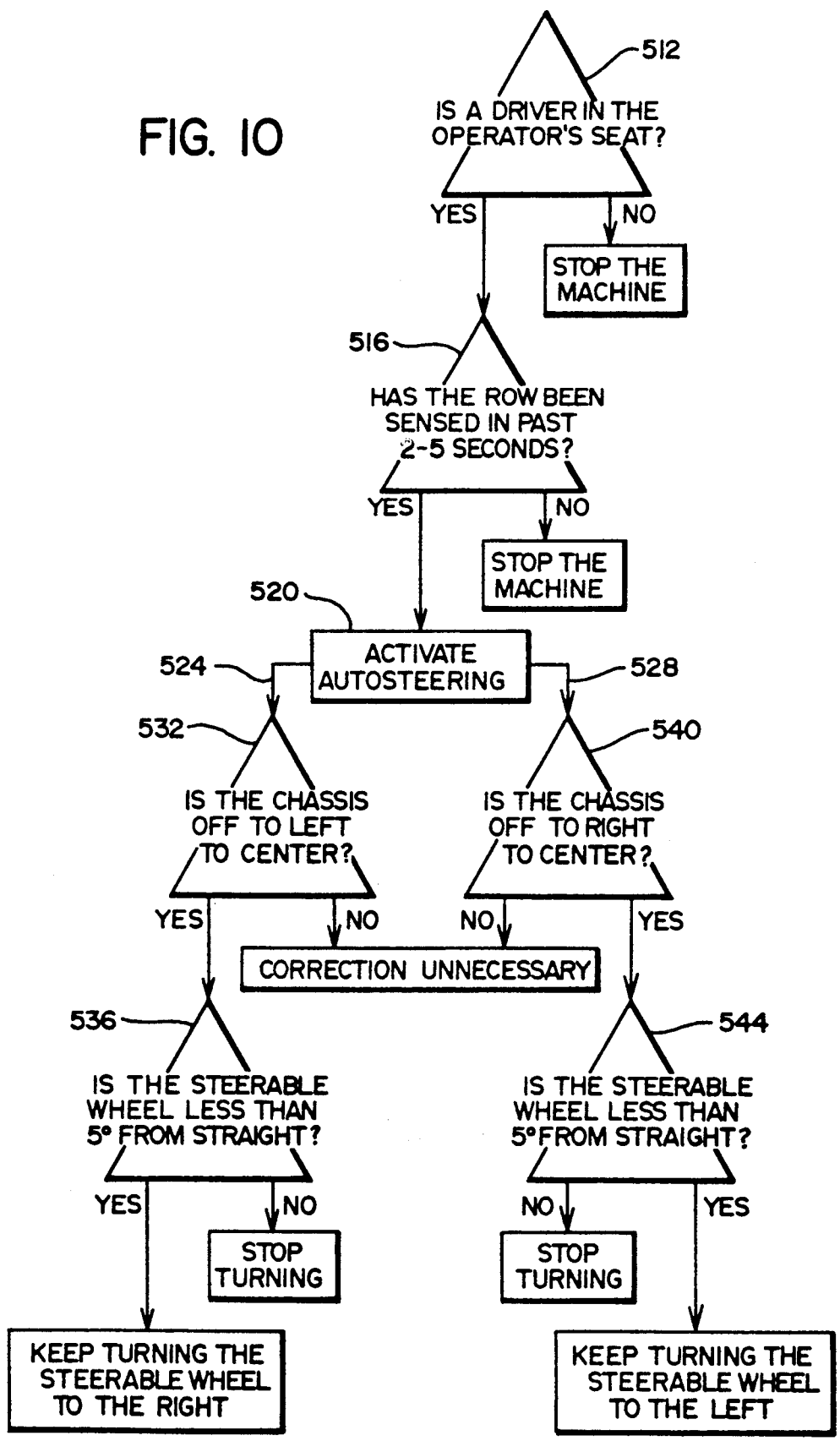
FIG. 10 is a diagram of logic used in the present invention.

FIG. 10 summarizes an embodiment of logic which the invention uses. In FIG. 10, various triangles represent decisions, upon which the automatic steering means 4 and the automatic machine shutdown means 8 act. According to triangle 512, if there is no attendant in the machine 10, then the chassis 20 halts. If an attendant is present, then the next decision represented by triangle 516 is addressed. According to triangle 516, if a predetermined amount of time, which is illustrated as two to five seconds, elapses without any contact occurring with the row 12, then the chassis 20 halts. If contact signals occur more frequently, then the logic proceeds to an automatic steering stage 520. The automatic steering stage 520 comprises a first branch of logic 524 and a second branch of logic 528. Under the branch 524, there is an initial decision represented by a triangle 532. According to triangle 532, if the chassis 20 is on center, then no steering correction is necessary. If the chassis 20 is off to the left of center, then the logic proceeds to a decision which triangle 536 represents. If the steerable wheel 88 is less than a predetermined angle, which is illustrated as five degrees, from straight, then the invention keeps turning the steerable wheel 28 to the right. If the steerable wheel 28 has rotated an angle of five degrees from straight (meaning that the wheel 28 is at a first or second pivot limit 211 and 212 of FIG. 5), then the wheel 28 stops pivoting. Under the second branch 528, the logic initially decides whether the chassis 20 has steered off to the right of center as represented in triangle 540. If it has not, then no correction is necessary. If it has, then the logic proceeds to another decision shown as triangle 544. If the steerable wheel 28 is less than five degrees from straight, then the wheel 28 keeps pivoting to the left. If the wheel 28 has rotated an arc of five degrees from straight, then the steerable wheel 28 stops pivoting.

In summary, the invention senses and monitors the position of the row 12 with respect to the machine 10 with entirely mechanical, non-hydraulic means. Because it accounts for variations in the thickness of plants in the row 12, it is self-sufficient. The invention also monitors the presence of the row to guard against overrunning of gaps in the row. Also, it eliminates steps required to correlate a corrective rotation of the steerable wheel 28 to a quantity of steering error.

In harvesting berries, the invention steers the chassis 20 sufficiently close to the row 12 to maximize the retrieval of berries during berry harvesting.

From the foregoing, it is apparent that this invention is one well adapted to attain the objects set forth above, together with other advantages. It is to be understood that various modifications could be made to the present invention without departing from the basic teachings thereof.

What is claimed is:

1. A crop tending machine adapted to travel along a crop row having a crop row axis and firs and second sides oppositely positioned relative to said crop row axis, said machine comprising:
   a. a chassis arranged to travel along said crop row axis, said chassis defining a crop engaging region with a alignment location which is desirably in alignment with said crop row axis during operation of said machine;
   b. location sensing means responsive to location of said machine relative to said crop row axis and arranged to provide an output related to distance of said alignment location from said crop row axis;
   c. steerable wheel means mounted to said machine so as to be movable between fist and second turning position in which said steerable wheel means turns said machine from straight ahead travel toward the first and second sides of the crop row, respectively;
   d. steering control means responsive to said location sensing means in a manner to move said steerable wheel means fully between said first and second positions in a manner to cause said machine to move in sequential curved turn segments back and fourth across said crop row axis;

wherein said control means is arranged to respond to an input that indicates that the alignment location is on the second side of the crop row to cause said steerable wheel means to move fully to said first position, and also to respond to an input that indicates that the alignment location is on the first side of the crop row axis to turn the steerable wheel means fully to the second position;

wherein said locating sensing means comprises first and second locating members arranged to engage said crop row on first and second sides thereof in a manner to sense location of said machine relative to said crop row, said control means being responsive to a difference in distance of said first and second locating members from said alignment location to turn said steerable wheel means in a direction toward the side where the locating member is at a lesser distance from said alignment location;

wherein said first locating member is operably connected to a first control member responsive to distance of said first locating member from said alignment location, and said second locating member is operatively connected to a second control member in a manner to be responsive to a distance of said second locating member from said alignment location;

wherein said control means comprises a differentiating control member responsive to outputs from first and second control members to initiate a steering signal corresponding to a difference in the outputs from the first and a second locating member.

2. The machine as recited in claim 1, wherein said first and second control members comprise, respectively, first and second bar means arranged to move parallel to one another.

3. The machine as recited in claim 2, wherein said differentiating control member is operably engaged to said first and second bar means in a manner that movement of either of said first and second bar means causes a corresponding movement of said differentiating control member, in a manner that equal and opposite movement of said bar means causes no movement of said differentiating control member and movement of said first and second bar means in the same direction causes movement of said differentiating control member in said same direction.

4. The machine as recited in claim 3, wherein said control means comprises first and second switch means responsive to movement of said differentiating control member in first and second directions corresponding to greater differentiating movement of said first and second bar means, respectively.

5. The machine as recited in claim 4, wherein said differentiating control means comprises a wheel means positioned between said first and second bar means, in a manner that an increment of movement of said first and second bar means in the same direction causes a corresponding increment of movement of said differentiating control means in the direction of movement of the first and second bar means, and a segment of movement of either of said first and second bar means separately causes a corresponding movement of said differentiating control means a distance of one-half of said segment in the direction of movement of the first or second bar means, respectively.

6. The machine as recited in claim 5, wherein there are first and second shutdown switches positioned for operative engagement of said first and second bar means, respectively, said machine further comprising shutdown control means which is responsive to both of said first and second shutdown switches sensing nonengagement with both of said first and second bar means to indicate a situation where said locating members are located in closer proximity to said alignment location, and to react to stop travel of said machine.

7. The machine as recited in claim 1, wherein said control means comprises first and second steering position switches located to sense when said steerable wheel means is in said first and second positions, respectively, said steering sensing switches being operatively connected to said control means to stop turning of said steerable wheel means when said steerable wheel means has reached a position to contact either of said first and section steering sensing switches.

8. A crop tending machine having first and second sides and able to travel along a crop row having a crop row axis and first and second crop sides oppositely positioned relative to said crop row axis, said machine comprising:

a. a chassis arranged to travel along said crop row axis, said chassis defining a crop engaging region with an alignment location which is desirably near said crop row axis during operation of said machine;

b. location sensing means responsive to location of said machine relative to said crop row axis and arranged to provide an output related to distance of said alignment location from said crop prow axis;

c. steerable wheel means for directing travel of said machine and mounted to said machine so as to be movable to, respectively, a first predetermined angular position or a second predetermined angular position that are angularly displaced relative to a straight ahead travel position, and which direct travel of said machine toward the first and second sides of the machine, respectively;

d. steering control means responsive to said location sensing means in a manner to move said steerable wheel means to said first angular position when said sensing means senses the location of the machine to be more toward said second crop side and to maintain said wheel means in said first angular position until said sensing means senses the location of the machine is more toward said first crop side, at which time said steering control means moves said wheel means to said second angular position and maintains said wheel means in said second angular position until said machine is more toward said second crop side, in a manner to cause said machine to move in sequential curved path segments back and fourth.

9. The apparatus as recited in claim 8, wherein said sensing means comprises first and second locating members arranged to engage said crop row on first and second sides thereof in a manner to sense location of said machine relative to said crop row, said control means being responsive to a difference in distance of said first and second latching members from said alignment location to turn said steerable wheel means in a direction toward the side where the locating member is at a lesser distance from said alignment location.

10. The apparatus as recited in claim 8, wherein said sensing means comprises first and second locating members arranged to engage said crop row on first and second sides thereof in a manner to sense location of said machine relative to said crop row; wherein said control means comprises a first locating member which is responsive to a distance of said first locating member from said alignment location and a second control member which is responsive to a distance of said second locating member from said alignment location; wherein said control means further comprises a differentiating control member which is operatively connected to said first and second control members in a manner that movement of either of said first and second control members causes a corresponding movement of said differentiating control member, in a manner that equal and opposite movement of said first and second control members causes substantially zero movement of said differentiating control member and movement to said first and second control members in the same direction causes movement of said differentiating control member in the same direction.

11. The apparatus as recited in claim 8, further comprising:
 a. a row contacting means which is arranged to contact said row;
 b. a gap warning means which is arranged to warn an operator of said machine when contact between said row contacting means and said row discontinues for more than a predetermined length of time.

12. The apparatus as recited in claim 8, wherein said sensing means comprises right and left sensing bar means each of which has a forward portion that curves forwardly and outwardly and middle and rearward portions that are aligned generally with a direction of travel of said machine, said sensing bar means being mounted in a manner to be maintained generally aligned with said direction of travel while being free to move laterally between a more inward neutral position and an outward position, said forward positions defining an inwardly and rearwardly converging crop receiving throat when said sensing bar means are both in said neutral position.

13. The apparatus as recited in claim 8, wherein said sensing means comprises first and second locating member arranged to engage said crop row on first and second sides thereof and aid control means comprises a first control member responsive to a distance of said first locating member from said alignment location, and a second control member which is responsive to a distance of said second locating member from said alignment location, wherein said control members are used to sum said distances in a manner to indicate a misalignment of said machine more to said first side or more to said second side and are used to indicate contact between said machine and said row said contact being monitored by a gap warning means which warns an operator of said machine when said contact discontinues for a predetermined length of time.

14. The apparatus as recited in claim 8, wherein said first and second turning positions are each angularly displaced from a straight ahead steering position by an amount which is sufficiently small so as to permit said steerable wheel means to attain said turning positions before pivoting of said steerable wheel means is reversed by said control means.

15. A method of tending crops which are in a crop row having a crop row axis and first and second crop sides oppositely positioned relative to said crop row axis, said method comprising:

a. moving a machine, which has first and second sides and a chassis, along said crop row axis, said chassis defining a crop engaging region with an alignment location which is desirably near alignment with said crop row axis during operation of said machine;
 b. operating a location sensing means responsive to a location of said machine relative to said crop row axis to provide an output related to distance of said alignment location from said crop row axis;
 c. operating a steerable wheel means mounted to said machine so as to move said wheel means to respectively first and second predetermined angular positions in which said steerable wheel means turns said machine from straight ahead travel toward the first and second sides, respectively, of the machine row in response to said location sensing means in a manner to move said steerable wheel means to said first angular position when said sensing means senses the location of the machine be more toward said second crop side and to maintain said wheel means in said first angular position until said sensing means senses the location of the machine is more toward said first crop side, at which time said steering control means moves said wheel means to said second angular position and maintains said wheel means in said second angular position until said machine is more toward said second crop side, in a manner to cause said machine to move in curved segments back and forth across said crop row axis.

16. The apparatus as recited in claim 15, wherein said sensing means comprises first and second locating members, respectively, arranged to engage said crop row on, respectively, first and second sides thereof; wherein said control means comprises a first control members whose movement is a function of distance of said first locating member from said alignment location, and a second control member whose movement is a function of a distance of said second locating member from said alignment location, wherein said first and second control members are arranged to move along parallel paths to one another.

17. An apparatus for warning an operator of a crop tending machine, said crop tending machine having a steerable wheel means which directs travel of said machine and a chassis arranged to travel along a crop row, said chassis defining a crop engaging region with an alignment location which is desirably generally in alignment with a crop row axis of said crop row during said operation of said machine, said apparatus comprising:
 a. a location sensing means responsive to location of said machine relative to said crop row axis and arranged to provide an output related to distance of said alignment location from said crop row axis;
 b. a location sensing means responsive to a crop engaging means which engages said crop row so as to determine a location of said machine relative to said crop row axis;
 c. a steering control means responsive to said location sensing means in a manner to turn said turnable steerable wheel means between different turning positions in a manner to correct a misalignment between a direction of travel of said machine and said crop row axis;
 d. a warning means that warns an operator of said machine about a gap in said crop row when contacts between said crop row engaging means and said crop row discontinues for more than a predetermined length of time.

18. The apparatus as recited in claim 17, wherein said sensing means comprises first and second locating members, respectively, arranged to engage said crop row, respectively on first and second sides thereof; wherein said control means comprises a first control agent which generates a first control response in response to contact between said first locating member and said first side, and a second control agent which generates a second control response in response to contact between said second locating member and said second side, wherein aid gap warning means monitors said control responses.

19. A crop tending machine adapted to travel along a crop row having a crop row axis and first and second sides oppositely positioned relative to said crop row axis, said machine comprising:
   a. a chassis arranged to travel along said crop row, said chassis defining a crop engaging region with an alignment location which is desirable generally in alignment with said crop row axis during operation of said machine;
   b. a locating sensing means responsive to location of said machine relative to said crop row axis, said location sensing means comprising first and second locating members, respectively, arranged to engage said crop row, respectively, on first and second sides thereof in a manner to sense location of said machine relative to said crop row;
   c. a steerable wheel means pivotally mounted to said machine for directing travel of said machine;
   d. a steering control means responsive to said location sensing means in a manner to control said steerable wheel means so as to counteract misalignments of a direction of travel of said machine from said crop row axis, said control means comprising a first bar means which is displaced along a first bar path by an amount which is a function of a distance of said first locating member from said alignment location, and a second bar means which is displaced along a second bar path by an amount which is a function of a distance of said second locating member from said alignment location, said control means further comprising a summing means which compares displacements of said first and second bar means, respectively, along said first and second bar paths, to determine a net misalignment of direction of travel of said machine from said crop row axis.

20. The apparatus as recited in claim 19, wherein said first bar means is arranged to be displaced in a first direction along said first bar path and said second bar means is arranged to be displaced in a second direction, which is opposed to said first direction along said second bar path, which is generally parallel to said first bar path.

* * * * *